US010687657B2

(12) United States Patent
Pugliese

(10) Patent No.: US 10,687,657 B2
(45) Date of Patent: *Jun. 23, 2020

(54) BEVERAGE PREPARATION MACHINE

(71) Applicant: NESTEC S.A., Vevey (CH)

(72) Inventor: Alexandre Pugliese, Paudex (CH)

(73) Assignee: Societe des Produits Nestle S.A., Vevey (CH)

(*) Notice: Subject to any disclaimer, the term of this patent is extended or adjusted under 35 U.S.C. 154(b) by 353 days.

This patent is subject to a terminal disclaimer.

(21) Appl. No.: 15/538,757

(22) PCT Filed: Dec. 17, 2015

(86) PCT No.: PCT/EP2015/080344
§ 371 (c)(1),
(2) Date: Jun. 22, 2017

(87) PCT Pub. No.: WO2016/102333
PCT Pub. Date: Jun. 30, 2016

(65) Prior Publication Data
US 2017/0360245 A1 Dec. 21, 2017

(30) Foreign Application Priority Data
Dec. 24, 2014 (EP) .................................. 14200310

(51) Int. Cl.
A47J 31/44 (2006.01)
H01H 9/16 (2006.01)
(Continued)

(52) U.S. Cl.
CPC ........ A47J 31/4407 (2013.01); G06F 3/0416 (2013.01); G06F 3/0484 (2013.01);
(Continued)

(58) Field of Classification Search
CPC ...... A47J 31/002; A47J 31/4492; A47J 31/52; G06F 3/0414; G06F 3/0488; G06F 3/044;
(Continued)

(56) References Cited

U.S. PATENT DOCUMENTS 4,150,264 A   4/1979  Lieberman
6,168,056 B1* 1/2001  Bertholon ............. A45C 13/30
                                                    224/264

(Continued)

FOREIGN PATENT DOCUMENTS

CN      102325483 A    1/2012
DE      10831850       1/2000
(Continued)

Primary Examiner — Tu B Hoang
Assistant Examiner — Vy T Nguyen
(74) Attorney, Agent, or Firm — K&L Gates LLP

(57) ABSTRACT

A food or beverage preparation machine, including a control panel, an actuator for setting at least one food or beverage preparation parameter to a predetermined value and a controlling unit, a pressure sensor electronically connected to the controlling unit for controlling the functioning of the food or beverage preparation machine, the actuator being pressure-sensitive and having a first end with a first deformable surface which is configured to receive a press action (F) from a user, a second end with a second deformable surface which is in physical contact with the pressure sensor, and an elongate portion connecting the first end and the second end the elongate portion being configured to transfer to the second end a pressure that has been generated at the first end, to set the at least one food or beverage preparation parameter.

13 Claims, 3 Drawing Sheets

(51) Int. Cl.
*H01H 13/83* (2006.01)
*H01H 13/807* (2006.01)
*H01H 3/24* (2006.01)
*G06F 3/041* (2006.01)
*G06F 3/0484* (2013.01)
*H01H 3/12* (2006.01)
*H01H 13/14* (2006.01)

(52) U.S. Cl.
CPC ............... *H01H 3/12* (2013.01); *H01H 3/24* (2013.01); *H01H 9/161* (2013.01); *H01H 13/14* (2013.01); *H01H 13/807* (2013.01); *H01H 13/83* (2013.01); *H01H 2219/052* (2013.01); *H01H 2219/054* (2013.01); *H01H 2219/06* (2013.01); *H01H 2221/02* (2013.01)

(58) Field of Classification Search
CPC ........... G06F 3/045; G06F 2203/04104; G06F 2203/04105; G06F 2203/04101; H01H 2231/012; H01H 2223/002; H01H 13/807; H01H 13/83; H01H 2219/052; H01H 2219/054; H01H 2219/06; H01H 2221/02; H01H 2223/004; H01H 3/24; H01H 9/161; H01H 2219/014; H01H 2219/062; H01H 2223/038; H01H 2229/046; H01H 13/14; H01H 13/705; H01H 2209/006; H01H 2223/054; H01H 3/12

USPC ........................ 99/280–285; 200/159, 300; 224/200–600
See application file for complete search history.

(56) References Cited

U.S. PATENT DOCUMENTS

| | | | | |
|---|---|---|---|---|
| 2001/0008848 | A1* | 7/2001 | Armstrong | A63F 13/06 463/37 |
| 2008/0237011 | A1* | 10/2008 | Lee | H01H 13/83 200/314 |
| 2013/0155723 | A1* | 6/2013 | Coleman | G02B 6/0018 362/621 |
| 2014/0134299 | A1* | 5/2014 | Guidorzi | A47J 31/4492 426/87 |
| 2016/0280454 | A1* | 9/2016 | Mills | A61J 3/002 |

FOREIGN PATENT DOCUMENTS

| | | |
|---|---|---|
| DE | 10309823 | 9/2004 |
| DE | 102011087004 | 5/2013 |
| EP | 0989573 A2 | 3/2000 |
| EP | 2695557 | 2/2014 |

\* cited by examiner

BEVERAGE PREPARATION MACHINE

CROSS REFERENCE TO RELATED APPLICATIONS

The present application is a National Stage of International Application No. PCT/EP2015/080344, filed on Dec. 17, 2015, which claims priority to European Patent Application No. 14200310.2, filed on Dec. 24, 2014, the entire contents of which are being incorporated herein by reference.

FIELD OF THE INVENTION

The present invention concerns a food or beverage preparation machine.

BACKGROUND OF THE INVENTION

Liquid food or beverage preparation machines are well known in the food science and consumer goods areas. Such machines allow a consumer to prepare at home a given type of food or beverage, for instance a coffee-based beverage, such as espresso or filter coffee.

Today, many beverage preparation machines for in-home use comprise a system which can accommodate portioned beverage ingredients. Such portions may be contained typically in pods, sachets or capsules.

The machine comprises a receptacle or cavity for accommodating said portioned beverage ingredients and a fluid injection system for injecting a fluid, such as water, under pressure into the pod or capsule. Thus the fluid, for example hot or cold water, passes through the capsule or pod and delivers a liquid food or beverage.

The beverage preparation machine usually comprises a machine head where the receptacle for accommodating said portioned beverage ingredients is situated, and a machine body containing other functional components of the machine, such as a water pump, a water heater and a controlling unit which manage the functional components of the machine in order to prepare a beverage. The beverage is prepared taking into account beverage preparation parameters of the machine. The values of certain beverage preparation parameters are set by a user of the beverage preparation machine by means of a Human-Machine Interface (HMI).

The Human-Machine Interface comprises a control panel comprising actuators which allow the user to select and/or to set the values of certain beverage preparation parameters. For example, the control panel of current beverage preparation machines may comprise push buttons or tactile touch screen areas by means of which a user may select a recipe from among a plurality of recipes, a fluid volume, a fluid temperature, a pressure or an infusion time. According to the selections made by the user, certain beverage preparation parameters are set to predetermined values.

The Human-Machine Interface also contains electronic circuits and electric/electronic connexions between push buttons and/or tactile touch screen areas of the control panel and the electronic circuits. The user's selections are electronically treated and transmitted to the controlling unit which takes them into account in preparing the beverage.

The Human-Machine Interface is positioned in the machine head, close to the receptacle or cavity for accommodating the portioned beverage ingredients and where the fluid, such as water, is injected.

Therefore, due to the proximity of the Human-Machine Interface and the receptacle where fluid is injected, fluid flows close to the Human-Machine Interface. Even if beverage preparation machines are designed to avoid fluid leakage, in the event of leakage, electrical components may be in contact with the fluid which could lead to a short circuit that damages the beverage preparation machines.

It is therefore an object of the present invention to provide a food or beverage preparation machine which resolves at least some of the above difficulties making it possible to improve in the prevention of short circuits and thus to provide additional safety for users manipulating the interface system of the food or beverage preparation machine.

SUMMARY OF THE INVENTION

In a first aspect of the invention, there is provided a food or beverage preparation machine, comprising a control panel, the control panel comprising an actuator for setting at least one food or beverage preparation parameter of the food or beverage preparation machine to a predetermined value and a controlling unit for controlling the functioning of the food or beverage preparation machine, the food or beverage preparation machine comprising a pressure sensor electronically connected with the controlling unit and associated with the actuator, the actuator being pressure sensitive and comprising a first end with a first deformable surface which is configured to receive a press action from a user, a second end with a second deformable surface which is in physical contact with the pressure sensor, and an elongate portion connecting the first end and the second end, the elongate portion being configured to transfer to the second end a pressure that has been generated at the first end, such that when a press action is applied to the first deformable surface, the pressure is transferred to the second deformable surface by the elongate portion and is applied to the pressure sensor so as to set the at least one food or beverage preparation parameter.

Thus, the elongate portion links the first end and the second end of the actuator and allows positioning of the pressure sensor at a distance from the first end of the actuator. A press action applied to the first end of the actuator is transmitted by the elongate portion to the second end, and the second end which is deformable, applies the received press action to the pressure sensor. Thus, a pressure sensor may be positioned at a distance from the first end while a press action applied to the first end is detected by the pressure sensor.

Therefore, the control panel of the food or beverage preparation machine may be positioned such that the pressure sensor is distant from the control panel which is a part of the food or beverage preparation machine which is accessible for a user of the beverage preparation machine. In a case of a beverage preparation machine in which the control panel is situated close to the receptacle for accommodating portioned beverage ingredients in which the fluid is injected, the pressure sensor is situated at a distance from this receptacle. Thus, the risk of a short circuit caused by a fluid coming into contact with an electric/electronic circuit is reduced.

According to a feature, the elongate portion is non-deformable and comprises a hollow cavity filled with a fluid.

The pressure of the fluid in the hollow cavity increases when a user applies a press action to the first deformable surface. The increment in the pressure of the fluid produces a press action in the pressure sensor. Thus, the pressure sensor detects a press action which has been applied to the first deformable surface.

According to an embodiment, the food or beverage machine further comprises a light source associated with the pressure-sensitive actuator, the pressure-sensitive actuator comprising a third end and a second elongate portion connecting the first end and the third end, the third end comprising a surface which is situated such that it is illuminated by the light source, the second elongate portion being configured to transmit to the first end light originating from the light source.

Therefore, the first end is illuminated by the light source which is situated close to the third end of the actuator and which is situated at a distance from the receptacle for accommodating portioned beverage ingredients in which fluid is injected.

According to a feature, the second elongate portion is non-deformable and comprises a hollow cavity filled with a fluid.

According to a feature, the inner walls of the hollow cavity are formed by a reflective surface.

Thus, light originating from the light source is reflected by the inner walls and travels inside the hollow cavity until it arrives at the first deformable surface which is thereby illuminated.

According to an embodiment, the fluid comprises a light-transmitting medium.

Thus, light originating from the light source is transmitted to the first end which is thereby illuminated.

Therefore, transmission of light through the light-transmitting medium improves the illumination of the first end of the actuator.

According to an embodiment, the elongate portion comprises a first tube connecting the first end of the actuator and the second end of the actuator and the second elongate portion comprises a second tube connecting the first end of the actuator and the third end of the actuator.

According to a particular embodiment, the elongate portion and the second elongate portion form a T-junction.

According to an embodiment, the actuator comprises a flexible push button.

According to a feature, the flexible push button comprises a surface portion constituting the first deformable surface.

Thus, when a user pushes the flexible push button on the first deformable surface, the fluid in the elongate portion transmits a pressure to the second deformable surface.

According to another feature, the surface portion is at least partially transparent.

This transparent surface may be illuminated by light originating from the light source.

According to an embodiment, the flexible push button comprises a transparent pad.

Thus, the press action applied to the second deformable surface may be greater enabling a less sensitive pressure sensor may be used.

According to an embodiment, the food or beverage preparation machine comprises a machine head having a receptacle for accommodating a portioned beverage ingredient and in which a fluid is injected for preparing a beverage and a machine body having functional components, the control panel being situated at the machine head and the pressure sensor being situated at the body machine.

Thus, in this beverage preparation machine, the pressure sensor is not situated close to the receptacle where a liquid is injected in order to prepare a beverage.

According to an embodiment, the machine head and the machine body are separated by a leak-tight wall.

Thus, the safety in such a beverage preparation machine is further improved.

According to a second aspect of the invention, there is provided an interface system for a food or beverage preparation machine comprising a control panel, the control panel comprising an actuator for setting at least one food or beverage preparation parameter of the food or beverage preparation machine to a predetermined value, further comprising a pressure sensor which may be electronically connected to a controlling unit, and that is associated with said actuator, said actuator being pressure-sensitive and comprising a first end with a first deformable surface which is configured to receive a press action from a user, a second end with a second deformable surface which is in physical contact with said pressure sensor, and an elongate portion connecting said first end and said second end, said elongate portion being configured to transfer to said second end a pressure that has been generated at said first end, such that when a press action is applied to said first deformable surface, said pressure is transferred to said second deformable surface by said elongate portion and is applied to said pressure sensor so as to set said at least one food or beverage preparation parameter.

The advantages of the interface system are similar to those of the food or beverage preparation machine.

As used in this specification, the words "comprises", "comprising", and similar words, are not to be interpreted in an exclusive or exhaustive sense. In other words, they are intended to mean "including, but not limited to.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

The invention is further described with reference to the following examples. It will be appreciated that the invention as claimed is not intended to be limited in any way by these examples.

Figure 1:
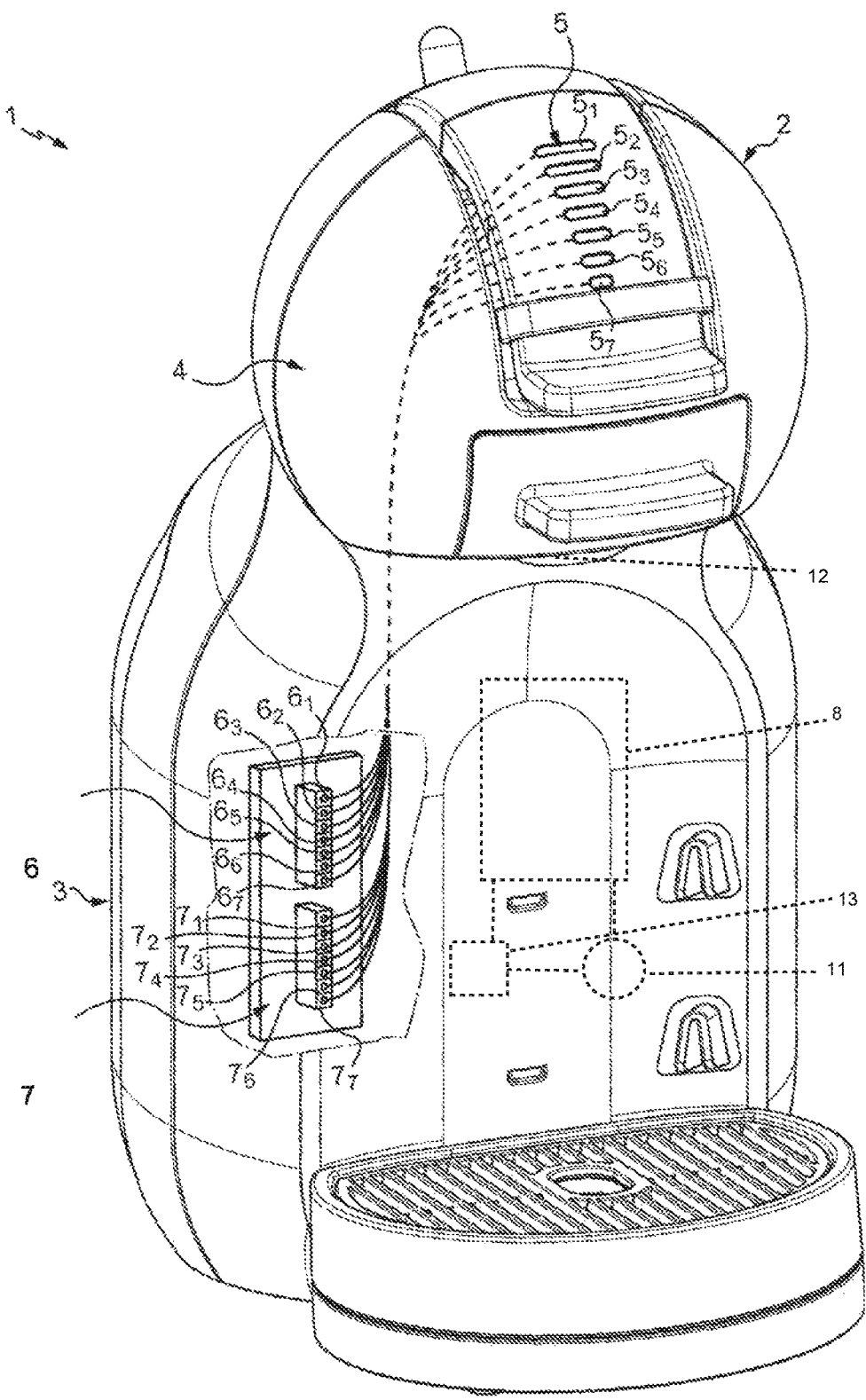
FIG. 1 illustrates a beverage preparation machine according to an embodiment the invention.

FIG. 1 illustrates a liquid food or beverage preparation machine 1 according to one embodiment. The beverage preparation machine 1 comprises a machine head 2 and a machine body 3.

To simplify the description, the food or beverage preparation machine 1 will be named below as beverage preparation machine 1. However, the present invention is also suitable for preparing food.

The beverage preparation machine 1 comprises a receptacle 14 for accommodating portioned beverage ingredients and a fluid injection system (not illustrated in the drawings) for injecting a fluid into the receptacle when preparing a beverage. The receptacle 14 and the fluid injection system are positioned at the machine head 2.

The beverage preparation machine 1 comprises a control panel 5 allowing a user to command the preparation of a beverage and to set the values of certain beverage preparation parameters or functional parameters.

For example, a user may select a recipe, a volume or a temperature respectively from among a set of recipes, a set of volumes or a set of temperatures. Thus, a beverage preparation parameter is set to a predetermined value which depends on the selection made by the user.

The control panel 5 is situated at the machine head 2 such that it is accessible to a user of the beverage preparation machine 1.

The control panel 5 comprises at least one actuator $5_1$, $5_2 \ldots 5_7$ for setting at least one beverage preparation parameter to a predetermined value.

The actuators $5_1, 5_2 \ldots 5_7$ are pressure-sensitive.

In the represented embodiment, the control panel 5 comprises a set of actuators $5_1, 5_2, \ldots 5_7$ forming a selection device, for selecting, for example, a volume for the beverage to be prepared from among a set of volumes. Thus, in this example, each actuator from among the set of actuators $5_1$, $5_2, 5_3 \ldots 5_7$ is associated with a predetermined value of volume.

Of course, the control panel 5 may comprise actuators for setting other beverage preparation parameters, such as a temperature, a pressure, an infusion time, a recipe, or an actuator for turning the machine on and off.

The beverage preparation machine 1 comprises a pressure sensor $6_1, 6_2 \ldots 6_7$ associated with each actuator $5_1$, $5_2 \ldots 5_7$.

Thus, in the represented embodiment, the beverage preparation machine 1 comprises a set of pressure sensors 6, each pressure sensor $6_1 \ldots 6_7$ being respectively associated with each actuator $5_1 \ldots 5_7$.

The set of pressure sensors 6 is positioned at the machine body 3, at a distance from the control panel 5.

At the machine body 3, the beverage preparation machine 1 comprises functional components, such as a water pump 11 and a water heater 8, and a controlling unit 13 for managing the functional components in order to prepare a beverage.

The controlling unit communicates with the pressure sensor, the controlling unit setting at least one beverage preparation parameter to a predetermined value when the at least one actuator receives a press action from a user.

Thus, a beverage is prepared taking into account beverage preparation parameters, certain of them being set by a user of the beverage preparation machine 1.

In the represented embodiment, a user may select a volume value for a beverage by means of the control panel 5. For example, the user applies an action, such as a press action, to one of the actuators $5_1 \ldots 5_7$.

Depending on the selected value, the controlling unit set a beverage preparation parameter relative to the volume of beverage to a predetermined value.

The functioning and interactions of the elements presented above will be described in reference to FIG. 2.

In the represented embodiment, the beverage machine 1 comprises a set of light sources 7, each light source $7_1 \ldots 7_7$ of the set of light sources 7 being associated with a respective actuator $5_1 \ldots 5_7$.

The set of light sources 7 is positioned at the machine body 3, at a distance of the control panel 5.

Each light source $7_1 \ldots 7_7$ illuminates a part of the control panel 5 corresponding to the actuator $5_1 \ldots 5_7$ associated with the light source $7_1 \ldots 7_7$ when an action, for example a press action, is applied to the actuator $5x$.

According to an embodiment, the light source $7_1 \ldots 7_7$ comprises at least one light-emitting diode (LED).

According to an embodiment, the machine head 2 and the machine body 3 are separated by a leak-tight wall 12.

By virtue of the leak-tight wall, the electric/electronic elements situated in the machine body 3 are isolated from elements in the machine head 2, in particular from the control panel 5, which is in contact with a user and which may be in contact with a fluid in an event of leakage.

Thus, this leak-tight wall separating the machine head 2 and the machine body 3 provides an additional safety measure for users manipulating the control panel 5.

Figure 2:
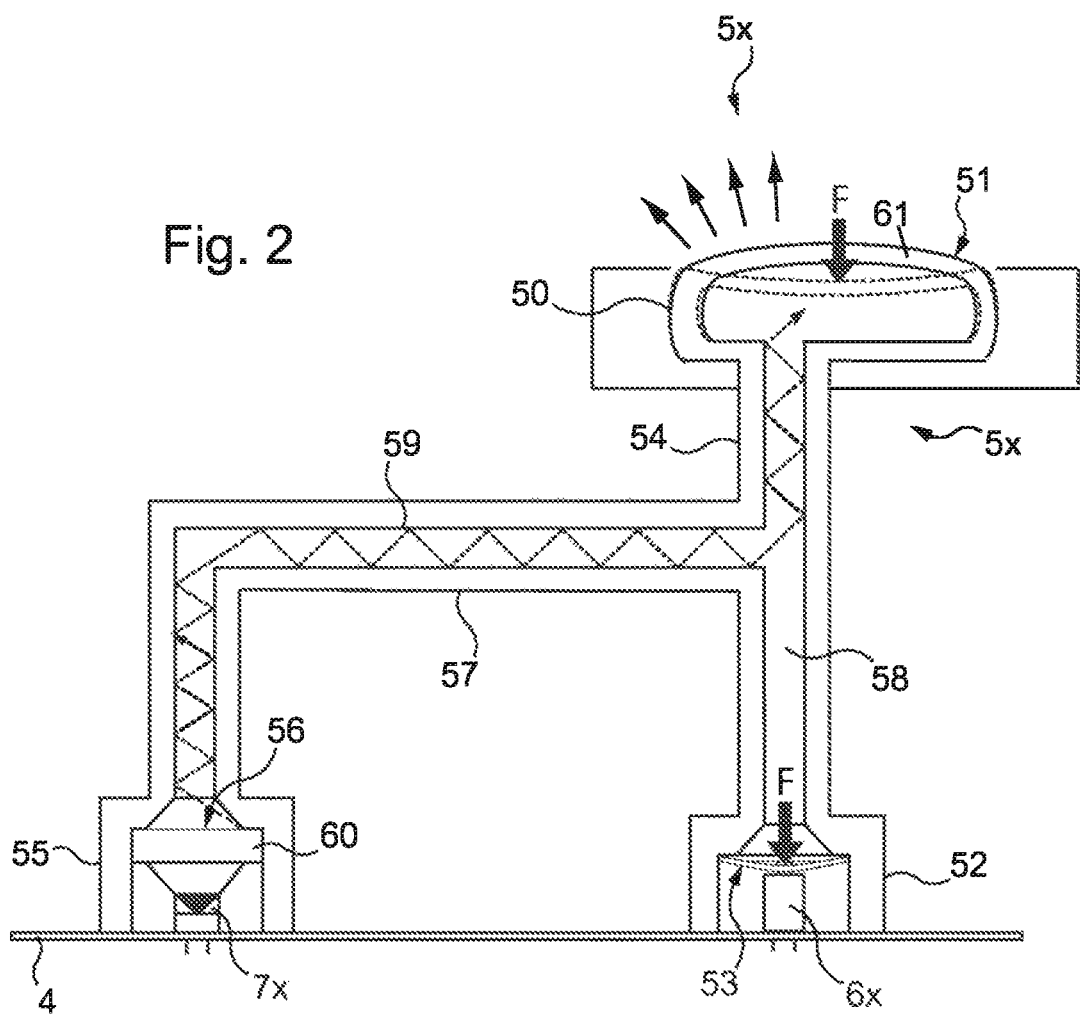
FIG. 2 illustrates a scheme representing a section view of a part of the machine comprising the control panel and elements in association therewith, according to an embodiment of the invention.
Figure 3:
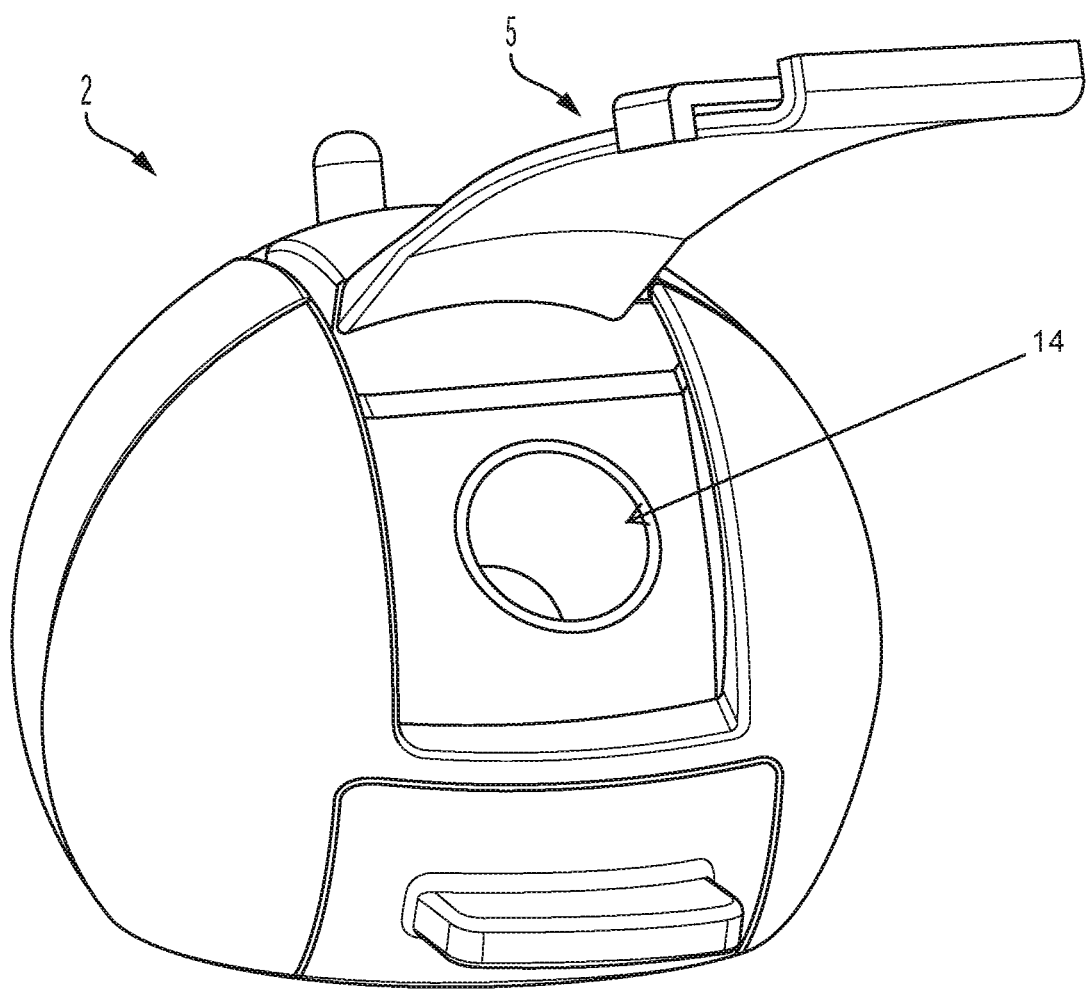
FIG. 3 illustrates a beverage machine head according to an embodiment of the invention.

FIG. 2 illustrates a scheme of a section view of a control panel and elements interacting with the control panel.

In this Figure, it can be seen a single actuator $5x$, a single pressure sensor $6x$ and a single light-source $7x$.

The pressure sensor $6x$ and the light source $7x$ are placed for example in a chip board 4.

The general functioning of these elements will be described with reference to this Figure.

It should be noted that the beverage preparation machine 1 comprises in general a set of actuators, a set of pressure sensors and a set of light-sources, each actuator being associated with a pressure sensor and with a light source, such as in the embodiment described with reference to FIG. 1.

According to an embodiment, the actuator $5x$ comprises:
- a first end 50 comprising a first deformable surface 51 which is configured to receive a press action F from a user;
- a second end 52 comprising a second deformable surface 53 which is in physical contact with said pressure sensor $6x$; and
- an elongate portion 54 extending between the first end 50 and the second end 52.

The elongate portion 54 is configured to transfer to the second end 52 a pressure that has been generated at said first end 50, such that when a press action F is applied to the first deformable surface 51, the pressure is transferred to the second deformable surface 53 by the elongate portion 54 and is applied to the pressure sensor $6x$.

According to the embodiment described with reference to FIG. 2, the actuator $5x$ comprises a third end 55 and a second elongate portion 57 extending between said first end 50 and said third end 55, the third end 55 comprising a surface 56 which is situated such that it is illuminated by the light source $7x$.

The second elongate portion 57 is configured to transmit light originating from the light source $6x$ to the first end 50.

The first elongate portion 54 and the second elongate portion 56 are non-deformable and comprise a hollow cavity 58 filled with a fluid.

The elongate portions 54, 57 being non-deformable, when a user applies a press action F to the first deformable surface 51, the fluid pressure increases and a press action F' is applied to the pressure sensor $6x$ by the fluid in the hollow cavity 58. The pressure sensor $6x$ generates a signal which is transmitted to the controlling unit, the signal indicating that the actuator $5x$ associated with the pressure sensor $6x$ has been pushed.

Next, the controlling unit sets a beverage preparation parameter accordingly.

In embodiments in which the beverage preparation machine 1 comprises a light source $7x$, the light source $7x$ is triggered by the controlling unit in order to be switched on.

The fluid in the hollow cavity 58 comprises a light-transmitting medium such as a fluorescent liquid, which transmits light generated by the light source 7x to the first end 50, the first deformable surface 51 being thereby illuminated.

According to an embodiment, the fluid in the hollow cavity 58 comprises fluorescein.

The fluorescence of such a fluorescent liquid is very intense and the interval of time elapsed from the excitation of molecules constituting the fluorescein to the light emission by the molecules is very short.

Thus, the light originating from the light source is transmitted rapidly to the first end 50.

According to an embodiment, an optical lens 60 may be disposed between the light source 7x and the third surface 56 such that light originating from the light source 7x is focused before entering the second elongated portion 59.

According to an embodiment, the elongate portion 54 comprises a first tube connecting the first end 50 of the actuator 5x and the second end 52 of the actuator 5x, and the second elongate portion 57 comprises a second tube connecting the first end 50 of the actuator 5x and the third end 55 of the actuator 5x.

It should be noted that in the described embodiment the first tube and the second tube communicate with each other.

For example, the tube corresponding to the elongate portion 54 and the second tube corresponding to the second elongate portion 57 form a T-junction.

According to another embodiment, the first tube and the second tube do not communicate with each other.

According to an embodiment, the first elongate portion 54 and the second elongate portion 57 comprise a material able to reflect light.

For example, the elongate portions 54, 57 comprise a transparent material, for example plastic, the transparent material and the fluid in the hollow cavity 58 being selected such that the respective reflective index are calculated such that the light originating from the light source 7x is reflected by the transparent material and travels inside the hollow cavity 58 until it arrives at actuator 5x.

For example, the reflective index of the transparent material is greater that the reflective index of the fluid in the hollow cavity 58.

In this embodiment, in order to enhance the reflection of the light inside the elongate portions 54, 57, the angle of incidence of the light arriving at the inner walls 59 of the hollow cavity 58 is greater than a predetermined value.

In another embodiment, the inner walls 59 of the hollow cavity 58 are formed by a reflective surface, for example a metallic reflective surface, such that the light originating from the light source 7x is reflected by the inner walls 59 and travels inside the hollow cavity 58 until it arrives at the first end 50 of the actuator 5x, the first deformable surface 51 being thereby illuminated.

According to the example described in reference to FIG. 2, the actuator 5 x comprises a flexible push button comprising a surface portion constituting the first deformable surface 51. According to an embodiment, the flexible push button comprises a transparent pad 61.

This surface portion may present different shapes, for example a circular, squared or oblong shape.

For example, the surface portion constituting the first deformable surface 51 is transparent such that it is illuminated by light originating from the associated light source 7x.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A food or beverage preparation machine comprising a controller and a control panel, the control panel comprising a set of actuators and a corresponding set of pressure sensors, the control panel is configured for a user to select a volume value, and each of the actuators and each of the corresponding pressure sensors are associated with a different volume value than the other actuators and the other pressure sensors, the set of actuators are each pressure-sensitive and comprise a first end with a first deformable surface which is configured to receive a press action from a user, a second end with a second deformable surface which is in physical contact with the corresponding pressure sensor, and a first elongated portion connecting the first end and the second end, the first elongated portion is configured to transfer to the second end a pressure that has been generated at the first end, such that when the press action is applied to the first deformable surface, the corresponding pressure is transferred to the second deformable surface by the first elongated portion and is applied to the pressure sensor, the pressure sensor is configured to detect the pressure and generate a pressure signal, the pressure sensor is electronically connected to the controller and configured to communicate the pressure signal to the controller, the controller is configured to detect the press action applied to set of actuators based on the pressure signal to set the volume value, wherein the first elongated portion is non-deformable and comprises a hollow cavity filled with a fluid, wherein the first elongated portion comprise a material configured to reflect light, and a reflective index of the material configured to reflect light is greater than a reflective index of the fluid in the hollow cavity, and a machine head having a receptacle for accommodating a portioned beverage ingredient and in which a fluid is injected for preparing a food or a beverage, and a machine body comprising a water pump and a water heater, wherein the control panel is situated at the machine head, and the set of pressure sensors is situated at the machine body, wherein machine head and the machine body are separated by a leak-tight wall.

2. The food or beverage preparation machine according to claim 1, comprising a light source associated with the set of actuators, the set of actuators each comprising a third end and a second elongated portion connecting the first end and the third end, the third end comprising a surface which is situated such that the third end is illuminated by the light source, and the second elongated portion is configured to transmit light originating from the light source to the first end.

3. The food or beverage preparation machine according to claim 2, wherein the second elongated portion is non-deformable and comprises a hollow cavity filled with a fluid.

4. The food or beverage preparation machine according to claim 3, wherein the inner walls of the hollow cavity of the second elongated portion are formed by a reflective surface.

5. The food or beverage preparation machine according to claim 3, wherein the fluid of the second elongated portion comprises a light-transmitting medium.

6. The food or beverage preparation machine according to claim 2, wherein the first elongated portion comprises a first tube connecting the first end of the set of actuators and the second end of the set of actuators, and the second elongated portion comprises a second tube connecting the first end of the set of actuators and the third end of the set of actuators.

7. The food or beverage preparation machine according to claim 2, wherein the first elongated portion and the second elongated portion form a T-junction.

8. The food or beverage preparation machine according to claim 1, wherein the each actuator comprises a flexible push button.

9. The food or beverage preparation machine according to claim 8, wherein the flexible push button comprises a surface portion constituting the first deformable surface.

10. The food or beverage preparation machine according to claim 9, wherein the surface portion is at least partially transparent.

11. The food or beverage preparation machine according to claim 8, wherein the flexible push button comprises a transparent pad.

12. The food or beverage machine according to claim 2, wherein the second elongated portion comprise a material configured to reflect light.

13. The food or beverage machine according to claim 3, wherein the second elongated portion comprise a material configured to reflect light, and a reflective index of the material configured to reflect light of the second elongated portion is greater than a reflective index of the fluid in the hollow cavity of the second elongated portion.

\* \* \* \* \*